US011474351B2

(12) United States Patent
Koiida et al.

(10) Patent No.: US 11,474,351 B2
(45) Date of Patent: Oct. 18, 2022

(54) HEAD-UP DISPLAY DEVICE

(71) Applicant: NIPPON SEIKI CO., LTD., Niigata (JP)

(72) Inventors: Akinori Koiida, Niigata (JP); Hiroyuki Furusawa, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 149 days.

(21) Appl. No.: 17/047,600

(22) PCT Filed: May 21, 2019

(86) PCT No.: PCT/JP2019/020027
§ 371 (c)(1),
(2) Date: Oct. 14, 2020

(87) PCT Pub. No.: WO2019/225571
PCT Pub. Date: Nov. 28, 2019

(65) Prior Publication Data
US 2021/0149192 A1 May 20, 2021

(30) Foreign Application Priority Data
May 23, 2018 (JP) .............................. JP2018-098456

(51) Int. Cl.
G02B 27/01 (2006.01)
G02B 17/00 (2006.01)
(Continued)

(52) U.S. Cl.
CPC ....... G02B 27/0101 (2013.01); G02B 17/008 (2013.01); G02B 17/06 (2013.01); B60K 35/00 (2013.01); B60K 2370/1529 (2019.05)

(58) Field of Classification Search
CPC .. G02B 27/0101; G02B 17/008; G02B 17/06; G02B 27/0149; B60K 35/00; B60K 2370/1529
See application file for complete search history.

(56) References Cited

U.S. PATENT DOCUMENTS

2018/0373027 A1* 12/2018 Higuchi .............. H04N 9/3164

FOREIGN PATENT DOCUMENTS

JP    2014-119718 A    6/2014
JP    2019-008177 A    1/2019

OTHER PUBLICATIONS

International Search Report issued in corresponding International Patent Application No. PCT/JP2019/020027, dated Jul. 23, 2019, with English translation.

* cited by examiner

Primary Examiner — James C. Jones
(74) Attorney, Agent, or Firm — McDermott Will & Emery LLP

(57) ABSTRACT

A head-up display device makes it possible to increase the number of common parts between when mounted in a right-hand-drive car and when mounted in a left-hand-drive car. A head-up display device includes: a first unit which generates display light; and a second unit to which the first unit is attached, and which displays a virtual image by guiding the display light generated by the first unit to a windshield. The first unit is provided with a projector which emits the display light, and a first optical relay which guides the display light from the projector to the second unit along a virtual plane. The second unit is provided with a second optical relay which guides the display light to the windshield such that an irradiation position at which the windshield is (Continued)

irradiated with the display light is shifted in a car width direction crossing the virtual plane.

5 Claims, 8 Drawing Sheets

(51) Int. Cl.
  *G02B 17/06* (2006.01)
  *B60K 35/00* (2006.01)

HEAD-UP DISPLAY DEVICE

CROSS REFERENCE TO RELATED APPLICATIONS

This application is the U.S. National Phase under 35 U.S.C. § 371 of International Application No. PCT/JP2019/020027, filed on May 21, 2019, which claims the benefit of Japanese Application No. 2018-098456, filed on May 23, 2018, the entire contents of each are hereby incorporated by reference.

TECHNICAL FIELD

The present invention relates to a head-up display device.

BACKGROUND ART

Conventionally, a head-up display device has been known that displays a virtual image on a front windshield or the like, for example, as described in Patent Document 1.

PRIOR ART DOCUMENT

Patent Document

Japanese Unexamined Patent Publication No. 2014-119718

SUMMARY OF THE INVENTION

Problems to be Solved by the Invention

The head-up display device is mounted on either a right-hand-drive car or a left-hand-drive car. Since the head-up display device is usually mounted in a portion of a dashboard facing the driver's seat, the position of the head-up display device is different for a right-hand-drive car and a left-hand-drive car. When the position at which the head-up display device is mounted is changed, the conditions including the position of the front windshield that receives display light from the head-up display device change. For this reason, the head-up display device for a right-hand-drive car and the head-up display device for a left-hand-drive car had to have different configurations in accordance with the conditions. Therefore, the parts for the head-up display device for a right-hand-drive car and the head-up display device for a left-hand-drive car could not be compatible, and many dedicated parts were required for each head-up display device.

An object of the present invention, which has been made in view of the above-described circumstances, is to provide a head-up display device in which the number of common parts can be increased for mounting on a right-hand-drive car and a left-hand-drive car.

Solution to Problem

The head-up display device according to an aspect of the present invention includes:
a first unit that generates display light; and
a second unit that displays a virtual image by guiding the display light generated by the first unit to a projection target member, the first unit being attached to the second unit, wherein,
the first unit includes:
a display that emits the display light;
a first optical relay that guides the display light from the display to the second unit along an imaginary plane; and
a first housing in which the display and the first optical relay are housed, and
the second unit includes:
a second optical relay that guides the display light to the projection target member to shift an irradiation position at which the projection target member is irradiated with the display light in an intersection direction intersecting the imaginary plane; and
a second housing in which the second optical relay is housed.

Effect of the Invention

The present invention can provide a head-up display device in which the number of common parts can be increased for mounting on a right-hand-drive car and a left-hand-drive car.

MODE FOR CARRYING OUT THE INVENTION

A head-up display device according to an embodiment of the present invention will be described with reference to the drawings.

Figure 1:
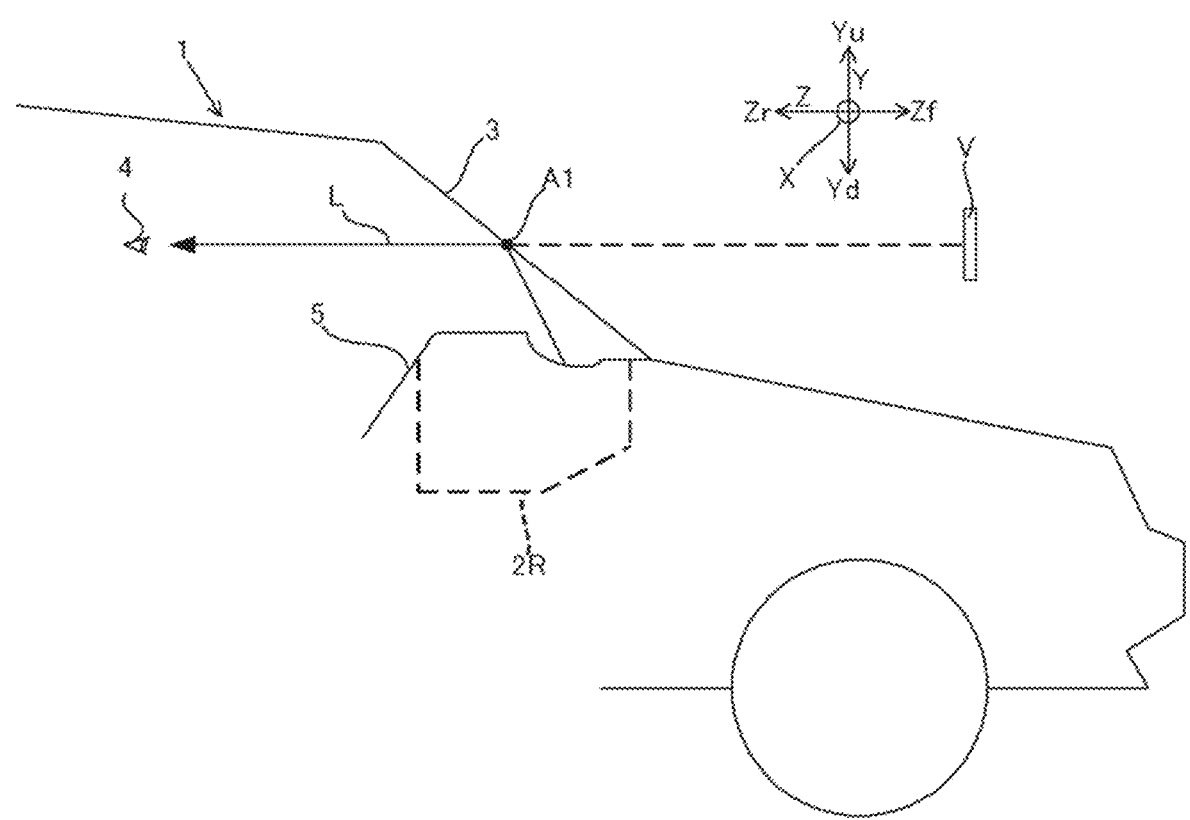
FIG. 1 is a schematic view of a vehicle equipped with a head-up display device according to an embodiment of the present invention.

As illustrated in FIG. 1, a head-up display device 2R is disposed on a dashboard 5 of a vehicle 1. The vehicle 1 is a right-hand-drive car, and the head-up display device 2R for a right-hand-drive car is disposed in the dashboard 5 at a position facing the front right seat. In the following description, the head-up display device 2R for a right-hand-drive car will be mainly described.

Note that, as will be described in detail below with reference to FIGS. 8A and 8B, the head-up display device 2R for a right-hand-drive car can share a first unit 3A with a head-up display device 2L for a left-hand-drive car, except for a spacer 44.

As illustrated in FIG. 1, the head-up display device 2R emits display light L toward a front windshield 3. A vehicle driver 4 receives the display light L reflected at the front windshield 3 and can visually recognize a virtual image V including vehicle information that is superimposed on the scenery.

Figure 2:
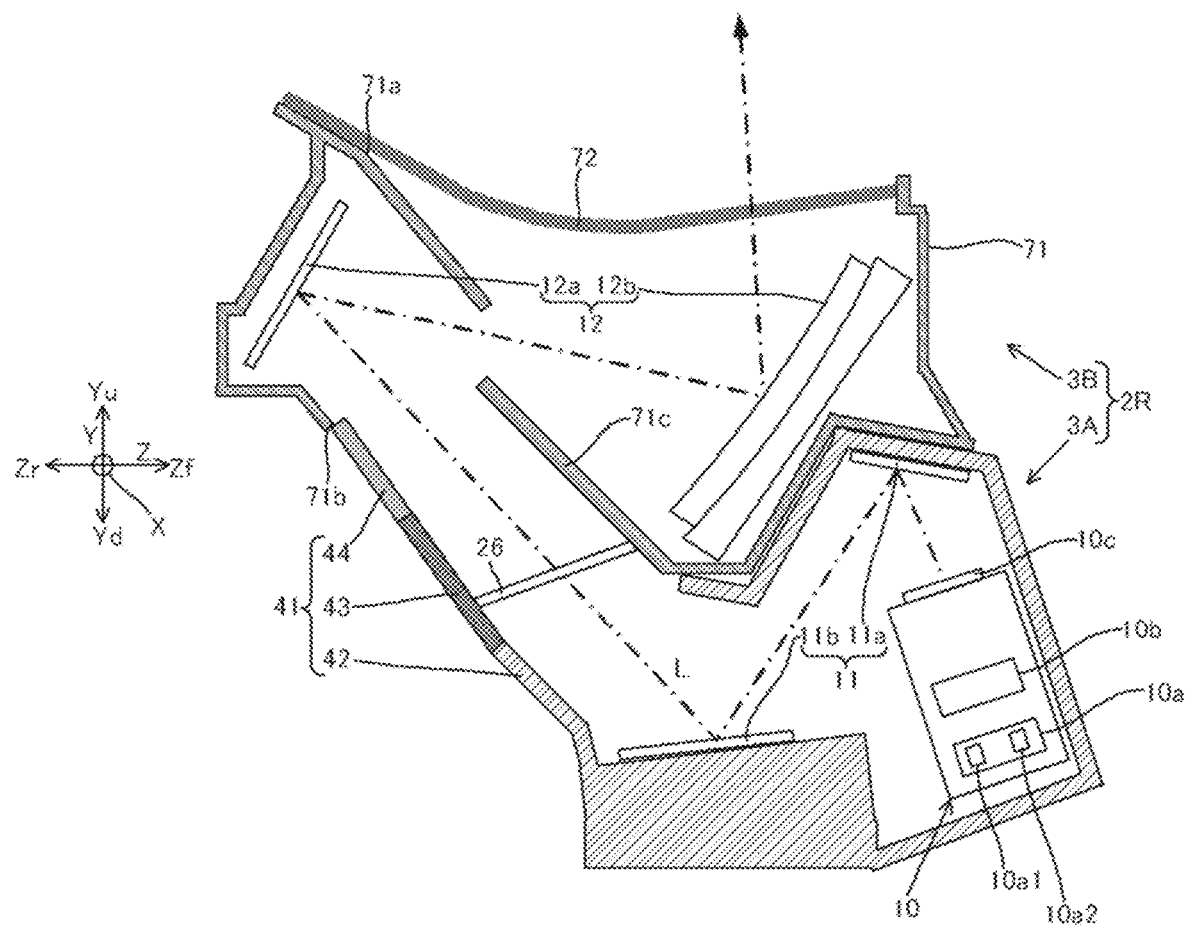
FIG. 2 is a schematic cross-sectional view of a head-up display device according to an embodiment of the present invention.

As illustrated in FIG. 2, the head-up display device 2R includes a first unit 3A that generates the display light L and a second unit 3B that guides the display light L generated by the first unit 3A to the front windshield 3.

The first unit 3A includes a transmissive screen 26, a first housing 41, a first optical relay 11 including reflectors 11a and 11b, and a projector 10 that is a display.

The first housing 41 is, for example, a hollow cube composed of light-shielding resin. The first housing 41 houses therein the transmissive screen 26, the projector 10, and the first optical relay 11. The specific configuration of the first housing 41 will be described below.

The projector 10 emits the display light L so as to display an image on the transmissive screen 26 by the field sequential method. The projector 10 is disposed in the forward direction Zf and the downward direction Yd inside the first housing 41 and emits the display light L diagonally toward the reflector 11a in the upward direction Yu and the rearward direction Zr.

The projector 10 includes a light source unit 10a, a reflective display element 10b including a digital mirror device, and a projection lens 10c.

The light source unit 10a includes an LED group 10a1 including a red LED (light-emitting diode), a green LED, and a blue LED, and a light combining unit 10a2 including a dichroic mirror and a reflecting mirror that combine light from the LED group 10a1.

The reflective display element 10b receives the combined light that has passed through the light combining unit 10a2, generates the display light L, and emits the display light L toward the projection lens 10c. The projection lens 10c expands the display light L in accordance with the transmissive screen 26.

Note that, in each drawing, the display light L is illustrated by the chief ray of the display light L.

The reflector 11a is a plane mirror and reflects the display light L from the projector 10 toward the reflector 11b. The reflecting face of the reflector 11a faces the projection lens 10c of the projector 10. The display light L reflected at the reflector 11a travels diagonally in the downward direction Yd and the rearward direction Zr.

The reflector 11b is a plane mirror and reflects the display light L from the reflector 11a toward the transmissive screen 26. The reflector 11b is disposed in the downward direction Yd and the rearward direction Zr relative to the reflector 11a. The reflecting face of the reflector 11b faces the upward direction Yu. The display light L reflected at the reflector 11b travels diagonally in the upward direction Yu and the rearward direction Zr.

The transmissive screen 26 has a rectangular plate shape, receives the display light L reflected at the reflector 11b on one of the faces, and transmits the display light L to the other side to form an image. The transmissive screen 26 is disposed in the upward direction Yu and the rearward direction Zr relative to the reflector 11b.

Figure 4:
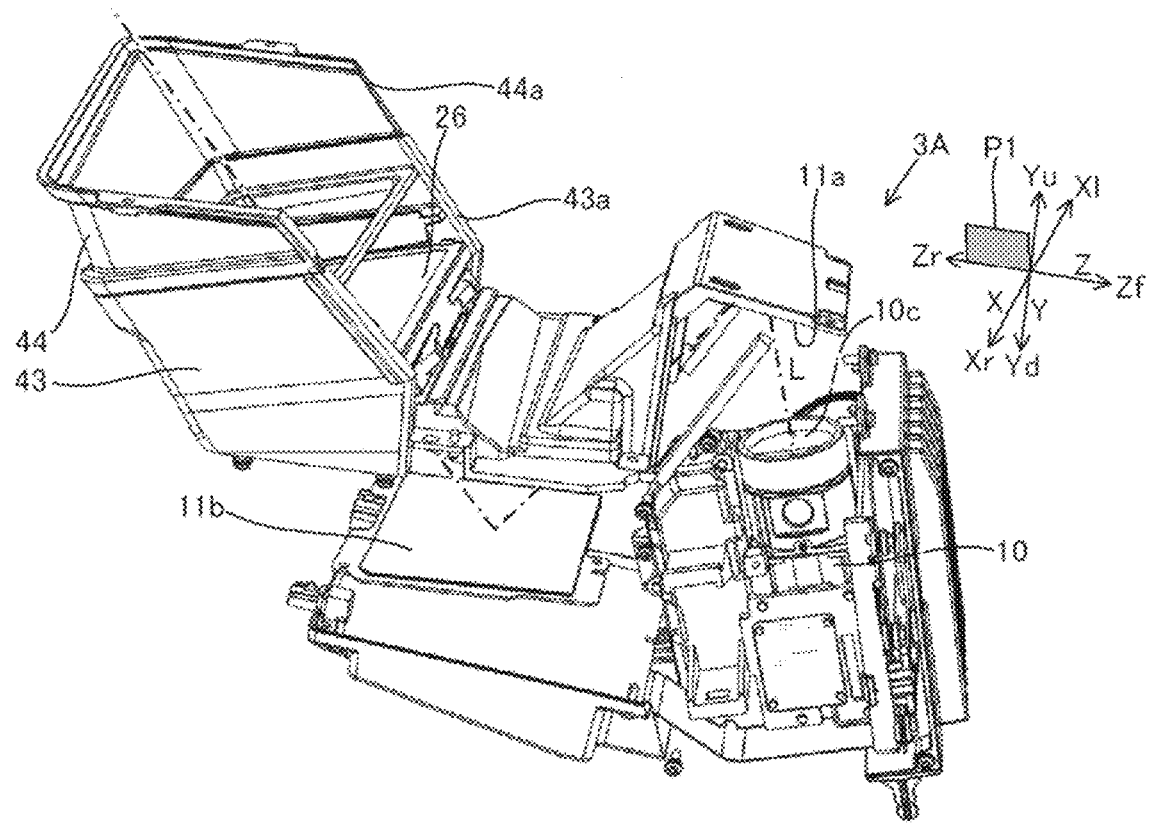
FIG. 4 is a perspective view of a first unit according to the embodiment of the present invention in which a portion of a housing body is omitted.
Figure 5:
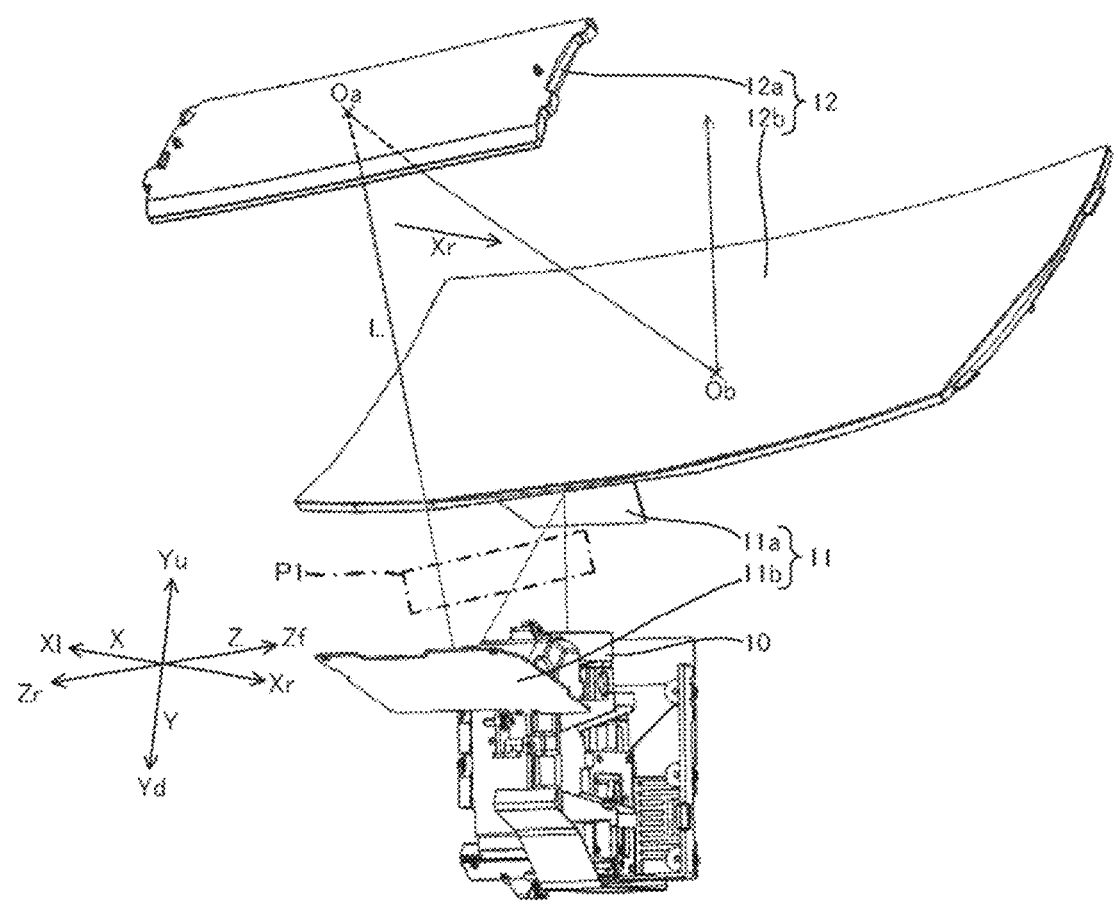
FIG. 5 is a perspective view of a projector, a first optical relay, and a second optical relay according to an embodiment of the present invention.

As illustrated in FIG. 4, the projector 10, the reflector 11a, and the reflector 11b are disposed along an imaginary plane P1. The imaginary plane P1 is a plane extending in the height direction Y and the front-back direction Z. To be precise, as illustrated in FIG. 8B, the imaginary plane P1 tilts such that it extends outward in the vehicle width direction X and to the right direction Xr along the upward direction Yu in a right-hand-drive car. For example, the imaginary plane P1 tilts at an angle within the range of 3 to 8 degrees to the height direction Y. Therefore, as illustrated in FIG. 5, the display light L travels between the projector 10, the reflector 11a, and the reflector 11b in an N shape along the imaginary plane P1.

Figure 3:
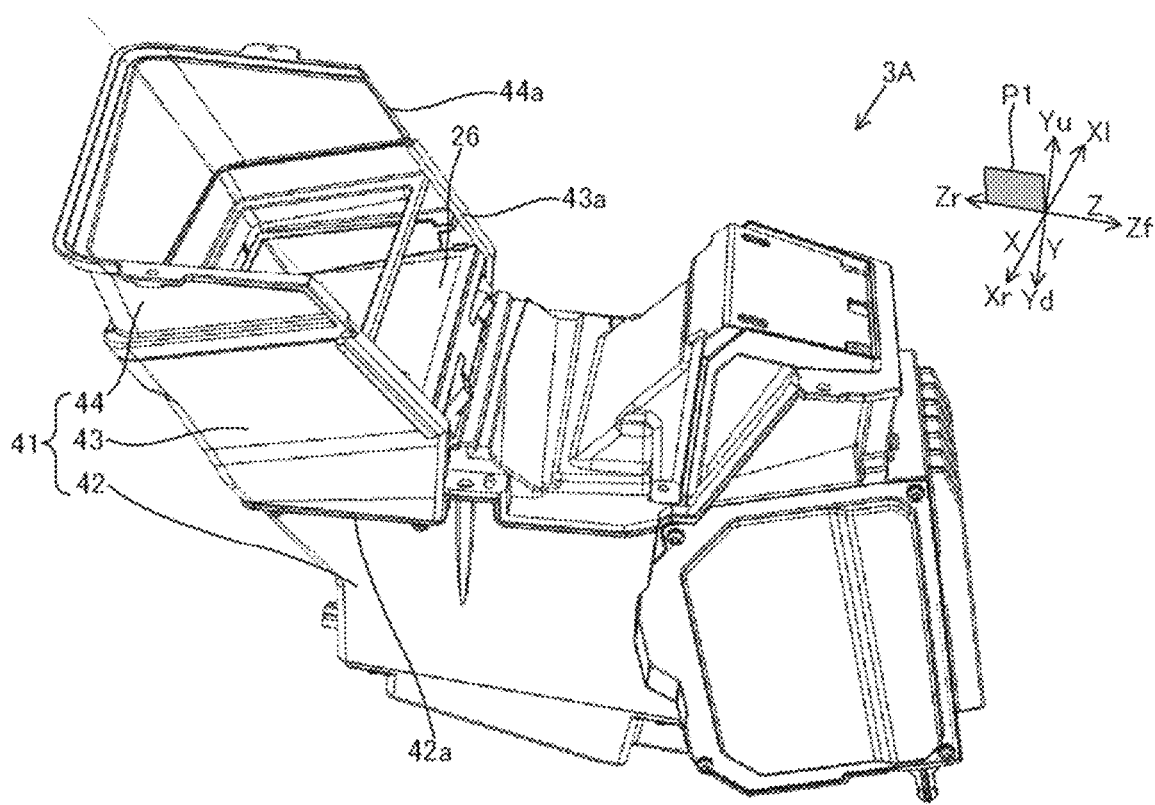
FIG. 3 is a perspective view of a first unit according to an embodiment of the present invention.

As illustrated in FIG. 3, the first housing 41 includes a housing body 42, a screen holder 43, and a spacer 44. The housing body 42, the screen holder 43, and the spacer 44 are composed of light-shielding resin as separate bodies.

The housing body 42 has a box shape and houses therein the projector 10 and the reflectors 11a and 11b. An opening 42a through which the display light L passes in the rearward direction Zr is formed in the upper face of the housing body 42.

The screen holder 43 has a shape in which one long sidewall is omitted from the four sidewalls of a rectangular cylinder, and holds the transmissive screen 26 therein. The screen holder 43 is attached to the opening 42a of the housing body 42. The internal space of the housing body 42 is continuous with the internal space of the screen holder 43. The screen holder 43 extends so as to tilt in the upward direction Yu and the rearward direction Zr. A side opening 43a that opens in the forward direction Zf is formed in the screen holder 43. The side opening 43a is closed by an inclined bottom plate 71c of the second housing 71 illustrated in FIG. 7.

As illustrated in FIGS. 2 and 3, the spacer 44 is disposed between the screen holder 43 and the second unit 3B, and has a function of mechanically coupling the first unit 3A to the second unit 3B. The spacer 44 has a shape in which one long sidewall is omitted from the four sidewalls of a rectangular cylinder, and is mounted on the upper portion of the screen holder 43. The internal space of the spacer 44 is continuous with the internal space of the screen holder 43. A side opening 44a that opens in the forward direction Zf is formed in the spacer 44. The side opening 44a is closed by an inclined bottom plate 71c of the second housing 71 illustrated in FIG. 7.

Figure 8B:
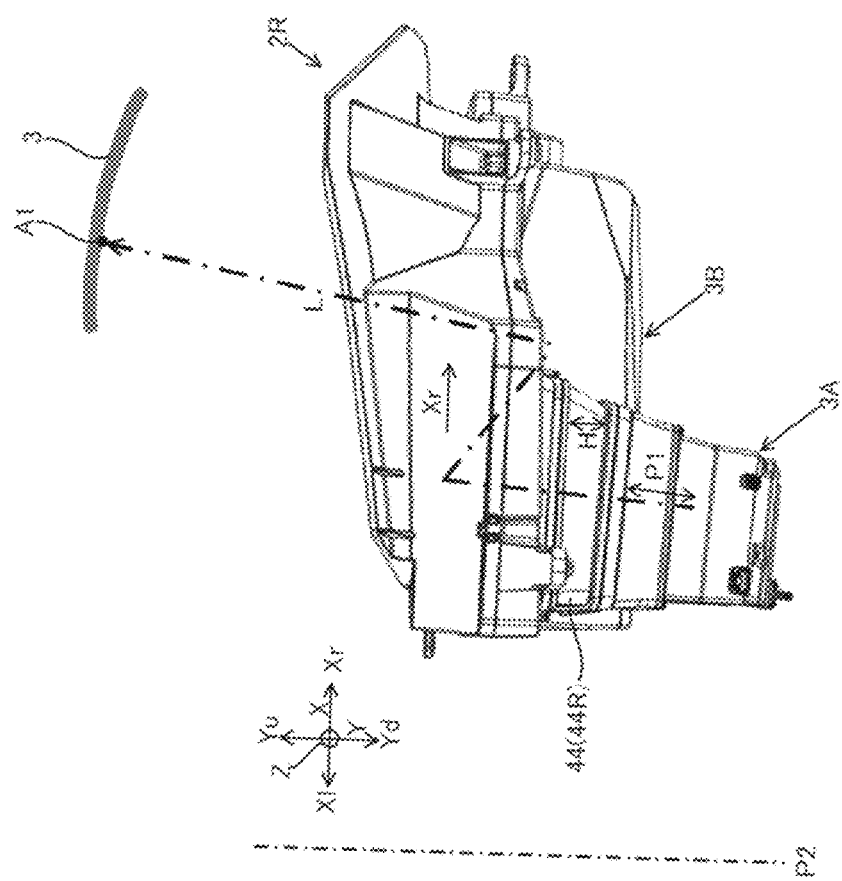
FIG. 8B is a front view of a head-up display device mounted on a right-hand-drive car of an embodiment of the present invention.
Figure 8A:
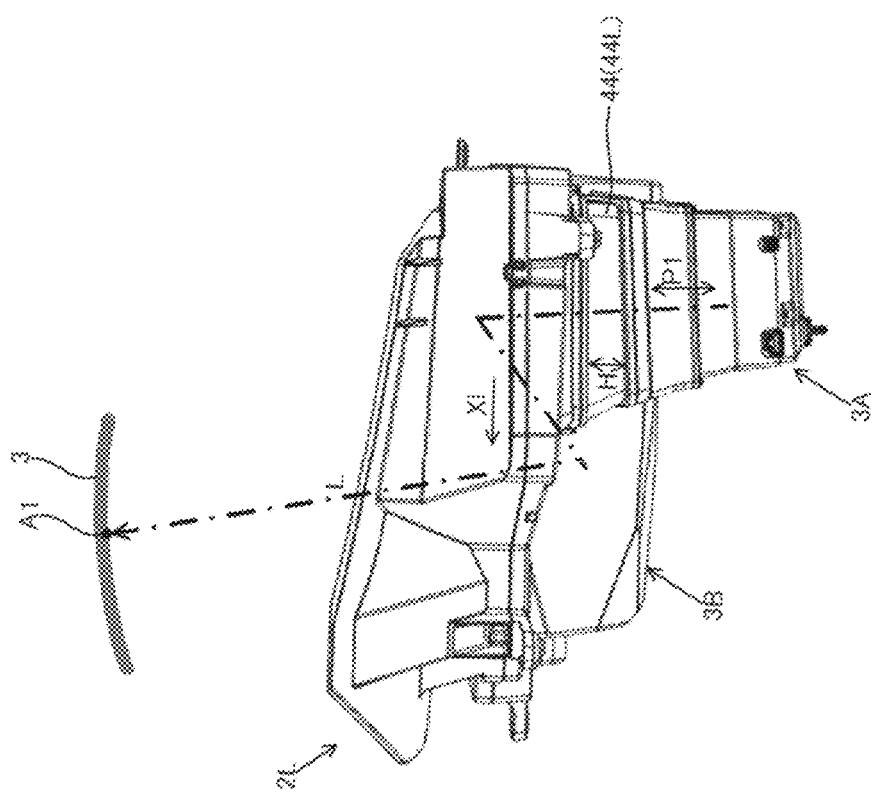
FIG. 8A is a front view of a head-up display device according to an embodiment of the present invention mounted on a left-hand-drive car.

As illustrated in FIGS. 8A and 8B, there are two types of spacers 44: a spacer 44R for a right-hand-drive car and a spacer 44L for a left-hand-drive car. The two spacers 44L and 44R are symmetric about a symmetry plane P2 extending in the height direction Y and the front-back direction Z.

The spacers 44L and 44R set the angle of the imaginary plane P1 to the height direction Y. Specifically, as illustrated in FIG. 8B, the spacer 44R for a right-hand-drive car is formed such that the height H in the height direction Y increases in the right direction Xr. As a result, the imaginary plane P1 along which the display light L in the first unit 3A extends defines a predetermined angle to the height direction Y in the clockwise direction when viewed from the forward direction Zf in FIG. 2, in other words, from the vehicle driver 4.

As illustrated in FIG. 8A, the spacer 44L for a left-hand-drive car is formed such that the height H in the height direction Y increases in the left direction Xl. As a result, the imaginary plane P1 along which the display light L in the first unit 3A extends defines a predetermined angle to the height direction Y in the counterclockwise direction when viewed from the forward direction Zf in FIG. 2, in other words, from the vehicle driver 4.

As illustrated in FIG. 2, the second unit 3B includes a second optical relay 12 including reflectors 12a and 12b, a second housing 71, and a translucent cover 72.

The second housing 71 has a shape of a box composed of light-shielding resin. The reflector 12a and the reflector 12b are housed in the second housing 71. A first opening 71a through which the display light L passes is formed in the upper face of the second housing 71. The translucent cover 72 is composed of translucent resin in a sheet shape and closes the first opening 71a.

Figure 7:
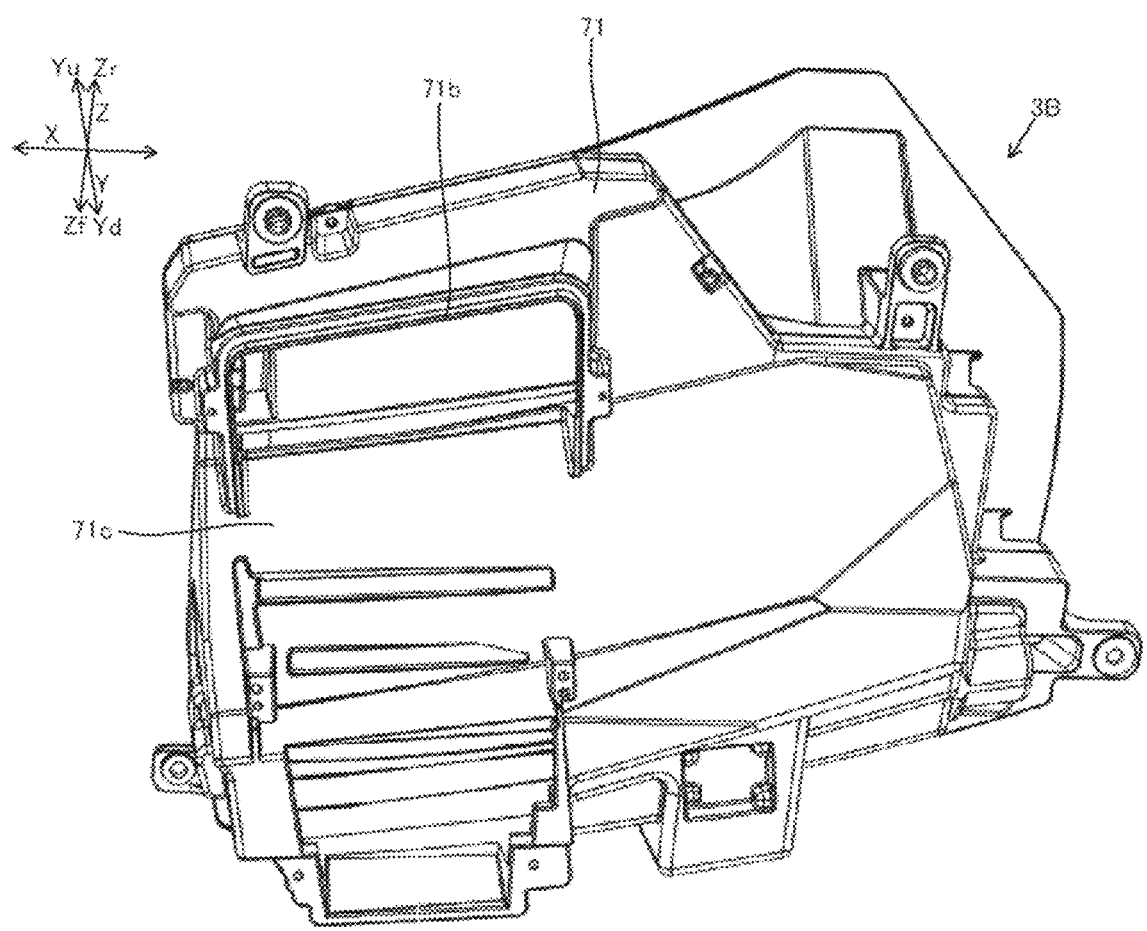
FIG. 7 is a perspective view of a second housing of the second unit according to an embodiment of the present invention.

As illustrated in FIG. 7, a second opening 71b through which the display light L from the first unit 3A passes is formed in the bottom of the second housing 71 in the downward direction Yd. The second opening 71b is surrounded by the upper edge portion of the spacer 44 of the first unit 3A.

The second housing 71 includes an inclined bottom plate 71c disposed in the front direction Zf of the second opening 71b. The inclined bottom plate 71c tilts in the downward direction Yd along the forward direction Zf. The inclined bottom plate 71c closes the side opening 44a in the spacer 44 and the side opening 43a in the screen holder 43 illustrated in FIG. 3.

Figure 6:
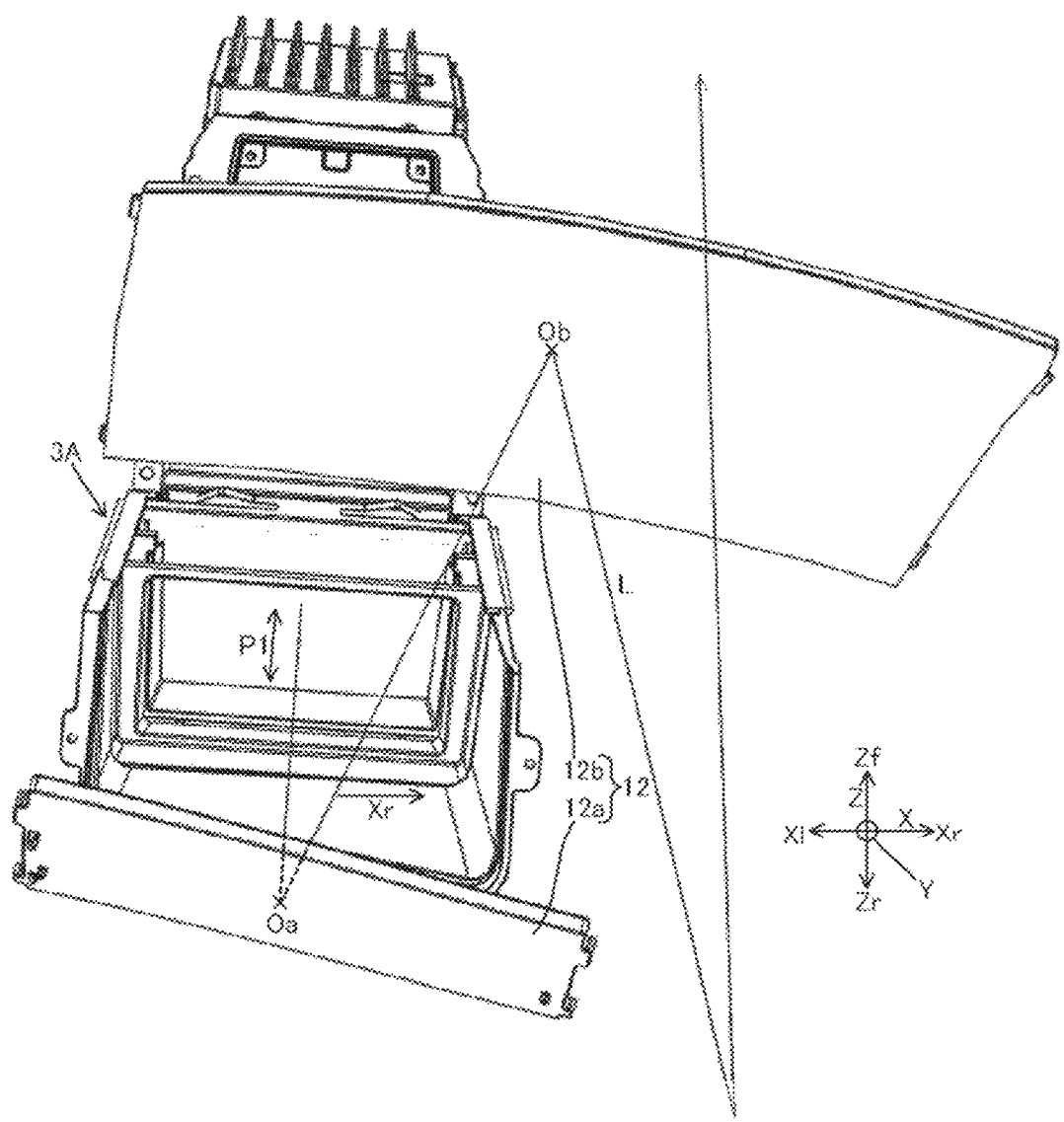
FIG. 6 is a perspective view of a first unit and a second optical relay according to an embodiment of the present invention.

As illustrated in FIG. 2, the reflector 12a is a plane mirror and reflects the display light L from the first unit 3A toward the reflector 12b. The reflector 12a is disposed in the upward direction Yu and the rearward direction Zr relative to the transmissive screen 26. The reflector 12a tilts in the forward direction Zf along the upward direction Yu. As illustrated in FIG. 6, the reflector 12a tilts in the rearward direction Zr along the right direction Xr. The display light L reflected at the reflector 12a travels diagonally in the forward direction Zf and the right direction Xr. Thus, the reflector 12a causes the display light L to travel in a direction intersecting the imaginary plane P1.

As illustrated in FIGS. 5 and 6, the reflector 12b is a concave mirror and reflects the display light L from the reflector 12a toward the front windshield 3. The reflector 12b is disposed in the forward direction Zf relative to the reflector 12a. The center position Ob of the reflector 12b is disposed outward in the vehicle width direction X relative to the center position Oa of the reflector 12a, at a position displaced to the right direction Xr for a right-hand-drive car. The reflector 12b tilts in the forward direction Zf along the upward direction Yu. The display light L reflected at the reflector 12b travels diagonally in the upward direction Yu and rearward direction Zr.

The second optical relay 12 has a function of shifting an irradiation position A1 at which the front windshield 3 is irradiated with the display light L, in the vehicle width direction X (intersection direction) intersecting the imaginary plane P1, as illustrated in FIG. 8B, through the position and orientation of the reflectors 12a and 12b. In the head-up display device 2R mounted on a right-hand-drive car, the second optical relay 12 shifts the irradiation position A1 of the display light L outward in the vehicle width direction X, and to the right direction Xr in a right-hand-drive car. The irradiation position A1 shifts in the right direction Xr as the distance between the reflector 12a and the reflector 12b increases in the vehicle width direction X.

This concludes the description of the configuration of the head-up display device 2R.

Referring to FIGS. 8A and 8B, the head-up display device 2L mounted on a left-hand-drive car will be explained in comparison with the head-up display device 2R mounted on a right-hand-drive car.

The second unit 3B of the head-up display device 2L is symmetrical to the second unit 3B of the head-up display device 2R about a symmetry plane P2. Therefore, in the head-up display device 2L, the second optical relay 12 shifts the irradiation position A1 of the display light L to the left direction Xl.

The spacer 44L for a left-hand-drive car is symmetrical to the spacer 44R for a right-hand-drive car about the symmetry plane P2. The first unit 3A excluding the spacer 44L of the head-up display device 2L has the same configuration as the first unit 3A excluding the spacer 44R of the head-up display device 2R. Thus, the first unit 3A excluding the spacer 44 can be shared between the head-up display devices 2L and 2R.

(Advantageous Effects)

According to the embodiment described above, the following advantageous effects are achieved.

(1) The head-up display devices 2L and 2R each include a first unit 3A and a second unit 3B. The first unit 3A generates display light L. The second unit 3B displays a virtual image V by guiding the display light L generated by the first unit 3A to a front windshield 3 that is an example of a projection target member. The first unit 3A includes is a projector 10, a first optical relay 11, and a first housing 41. The projector 10 is an example of a display emitting the display light L. The first optical relay 11 guides the display light L from the projector 10 to the second unit 3B along an imaginary plane P1. The first housing 41 houses therein the projector 10 and the first optical relay 11. The second unit 3B includes a second optical relay 12 and a second housing 71. The second optical relay 12 guides the display light L to the front windshield 3 so as to shift an irradiation position A1 at which the front windshield 3 is irradiated by the display light L, in a vehicle width direction X (intersection direction) intersecting the imaginary plane P1. The second housing 71 houses therein the second optical relay 12.

The direction of the shift of the irradiation position A1 of the display light L is different between a right-hand-drive car and a left-hand-drive car. Specifically, as illustrated in FIG. 8B, the irradiation position A1 is shifted to the right direction Xr in the vehicle width direction X in the head-up display device 2R of a right-hand-drive car, and, as illustrated in FIG. 8A, the irradiation position A1 is shifted to the left direction Xl in the vehicle width direction X in the head-up display device 2L of a left-hand-drive car.

According to the above-described configuration, since the irradiation position A1 is not shifted in the vehicle width direction X by the first unit 3A, the first unit 3A can be shared between the head-up display device 2R mounted on a right-hand-drive car and the head-up display device 2L mounted on a left-hand-drive car. This can increase the number of common parts of the head-up display devices 2R and 2L.

(2) The second housing 71 has a second opening 71b through which the display light L from the first unit 3A passes. The first housing 41 includes a housing body 42 and a spacer 44. The housing body 42 houses therein the projector 10 and the first optical relay 11. The spacer 44 is formed separately from the housing body 42 so as to surround a portion of the circumference of the display light L and is fixed to the second housing 71 so as to surround a portion of the circumference of the second opening 71b of the second housing 71.

According to this configuration, by replacing the spacer 44 of the first unit 3A, as illustrated in FIGS. 8A and 8B, the imaginary plane P1 can be oriented so that it is aligned with the head-up display devices 2L, 2R.

(3) The first unit 3A includes a transmissive screen 26 that receives the display light L that has passed through the first optical relay 11 and forms an image. The projector 10 includes a light source unit 10*a* and a reflective display element 10*b* that receives light from the light source unit 10*a* and emits the display light L. The first optical relay 11 is disposed along the imaginary plane P1, and includes two reflectors 11*a* and 11*b* that guide the display light L to the second unit 3B by reflecting the display light L. The second optical relay 12 includes two reflectors 12*a* and 12*b* that have center positions Oa and Ob that are disposed at different positions in the vehicle width direction X (intersection direction) and guide the display light L to the front windshield 3 by reflecting the display light L.

According to this configuration, the first unit 3A can be shared between the head-up display devices 2L and 2R.

(Modification)

Note that the above-described embodiment can be implemented in the following forms that are appropriately modified.

In the above-described embodiment, the screen holder 43 and the spacer 44 are formed as separate bodies, but alternatively, the screen holder 43 and the spacer 44 may be an integrated body. Alternatively, the screen holder 43 and the spacer 44 may be integrated with the housing body 42.

In the above-described embodiment, the first optical relay 11 includes two reflectors 11*a* and 11*b*, but alternatively, the number of reflectors may be one or three or more.

Similarly, the second optical relay 12 includes two reflectors 12*a* and 12*b*, but alternatively, the number of reflectors may be one or three or more.

In the above-described embodiment, the display light L from the projector 10 reaches the transmissive screen 26 after passing through the first optical relay 11, but alternatively, the display light L may reach the first optical relay 11 after passing through the transmissive screen 26.

In the above-described embodiment, the side openings 43*a* and 44*a* are formed in the screen holder 43 and the spacer 44. However, the side openings 43*a* and 44*a* may be omitted, and the screen holder 43 and the spacer 44 may have tubular shapes that surround the entire circumference of the display light L that has passed through the transmissive screen 26.

In the above-described embodiment, the transmissive screen 26 is disposed in the first unit 3A, but alternatively, the transmissive screen 26 may be disposed in the second unit 3B.

In the above-described embodiment, the projector 10 is one that includes a reflective display element 10*b* including a digital mirror device, but alternatively, the projector 10 may be an LCOS (liquid crystal on silicon) projector, a GLV (grating light valve) projector, a CRT (cathode ray tube) projector, a liquid crystal projector, or the like.

In the above-described embodiment, the display is the projector 10, but alternatively, the display may be an organic EL (electro-luminescent) display or a liquid crystal display for displaying an image. In such a case, the transmissive screen 26 may be omitted.

In the above-described embodiment, the head-up display devices 2L and 2R irradiate the front windshield 3, which is a projection target member, with the display light L. However, the projection target member is not limited to the front windshield 3 and may alternatively be a dedicated conveyor composed of a transmissive plate material.

In the above-described embodiment, the head-up display devices 2L and 2R are mounted on the vehicle, but may be mounted on a ship, an airplane, etc. besides a vehicle.

DESCRIPTION OF REFERENCE NUMERALS

1 vehicle
2L, 2R head-up display device
3 front windshield
3A first unit
3B second unit
10 projector (display)
10*a* light source unit
10*b* reflective display element
11 first optical relay
11*a*, 11*b* reflector
12 second optical relay
12*a*, 12*b* reflector
26 transmissive screen
41 first housing
42 housing body
43 screen holder
44, 44L, 44R spacer
71 second housing
71*a* first opening
71*b* second opening
71*c* inclined bottom plate
72 translucent cover
A1 irradiation position
L display light
P1 imaginary plane
V virtual image

The invention claimed is:

1. A head-up display device to be mounted on a right-hand drive vehicle or a left-hand drive vehicle, the head-up display device comprising:
a first unit that generates display light,
wherein the first unit accommodates i) a second unit for the right-hand-drive vehicle when the head-up display device is to be mounted on the right-hand-drive vehicle and ii) a second unit for the left-hand-drive vehicle when the head-up display device is to be mounted on the left-hand-drive vehicle,
wherein each of the second unit for the right-hand-drive vehicle and the second unit for the left-hand-drive vehicle displays a virtual image by guiding the display light generated by the first unit to an irradiation position on a projection target member,
wherein the first unit includes:
a display that emits the display light;
a first optical relay that guides the display light from the display along an imaginary plane to i) the second unit for the right-hand-drive vehicle when the head-up display device is to be mounted on the right-hand-drive vehicle and ii) the second unit for the left-hand-drive vehicle when the head-up display device is to be mounted on the left-hand-drive vehicle; and
a first housing in which the display and the first optical relay are housed, wherein the second unit for the right-hand-drive vehicle includes:
a second optical relay for the right-hand-drive vehicle that guides the display light to the projection target member such that the irradiation position on the projection target member is positioned to be closer to a right-hand-side of the right-hand-drive vehicle than the imaginary plane in an intersection direction intersecting the imaginary plane; and
a second housing for the right-hand-drive vehicle in which the second optical relay for the right-hand-drive vehicle is housed, and
wherein the second unit for the left-hand-drive vehicle includes:
a second optical relay for the left-hand-drive vehicle that guides the display light to the projection target member such that the irradiation position on the projection target member is positioned to be closer to a left-hand-side of the left-hand-drive vehicle than the imaginary plane in the intersection direction; and a second housing for the left-hand-drive vehicle in which the second optical relay for the left-hand-drive vehicle is housed.

2. The head-up display device according to claim 1, wherein, each of the second housing for the right-hand-drive vehicle and the second housing for the left-hand-drive vehicle has an opening through which the display light from the first unit passes, a spacer for the right-hand-drive vehicle is provided between the first housing and the second housing for the right-hand-drive vehicle, the spacer for the right-hand-drive vehicle surrounds at least a portion of a circumference of the display light, the spacer for the right-hand-drive vehicle is fixed to the second housing of the right-hand-drive vehicle to surround at least a portion of the opening in the second housing for the right-hand-drive vehicle, a spacer for the left-hand-drive vehicle is provided between the first housing and the second housing for the left-hand-drive vehicle, the spacer for the left-hand-drive vehicle surrounds at least a portion of a circumference of the display light, and the spacer for the left-hand-drive vehicle is fixed to the second housing of the left-hand-drive vehicle to surround at least a portion of the opening in the second housing for the left-hand-drive vehicle.

3. The head-up display device according to claim 1, wherein, the display comprises a projector, the first unit includes a transmissive screen that receives the display light that has passed through the first optical relay and forms an image, the projector includes:
a light source unit; and
a reflective display element that receives light from the light source unit and emits the display light, the first optical relay includes a plurality of reflectors disposed along the imaginary plane and guides the display light by reflecting the display light from the projector to i) the second unit for the right-hand-drive vehicle when the head-up display device is to be mounted on the right-hand-drive vehicle and to ii) the second unit for the left-hand-drive vehicle when the head-up display device is to be mounted on the left-hand-drive vehicle, and each of the second optical relay for the right-hand-drive vehicle and the second optical relay for the left-hand-drive vehicle includes a plurality of reflectors disposed at different positions in the intersection direction and guides the display light to the projection target member by reflecting the display light.

4. The head-up display device according to claim 2, wherein, the display comprises a projector, the first unit includes a transmissive screen that receives the display light that has passed through the first optical relay and forms an image, the projector includes:
a light source unit; and
a reflective display element that receives light from the light source unit and emits the display light, the first optical relay includes a plurality of reflectors disposed along the imaginary plane and guides by reflecting the display light from the projector to i) the second unit for the right-hand-drive vehicle when the head-up display device is to be mounted on the right-hand-drive vehicle and to ii) the second unit for the left-hand-drive vehicle when the head-up display device is to be mounted on the left-hand-drive vehicle, and each of the second optical relay for the right-hand-drive vehicle and the second optical relay for the left-hand-drive vehicle includes a plurality of reflectors disposed at different positions in the intersection direction and guides the display light to the projection target member by reflecting the display light.

5. The head-up display device according to claim 1, wherein 1) when the second unit for the right-hand-drive vehicle and the second unit for the left-hand-drive vehicle are placed next each other such that i) the second unit for the right-hand-drive vehicle is oriented in a position at which the second unit for the right-hand-drive vehicle is to be mounted on the right-hand-drive vehicle and ii) the second unit for the left-hand-drive vehicle is oriented in a position at which the second unit for the left-hand-drive vehicle is to be mounted on the left-hand-drive vehicle, the second unit for the right-hand-drive vehicle and the second unit for the left-hand-drive vehicle are symmetrical about an imaginary symmetry plane, and wherein the imaginary symmetry plane is located between i) the second unit for the right-hand-drive vehicle is oriented in the position at which the second unit for the right-hand-drive vehicle is to be mounted on the right-hand-drive vehicle and ii) the second unit for the left-hand-drive vehicle is oriented in the position at which the second unit for the left-hand-drive vehicle is to be mounted on the left-hand-drive vehicle such that the imaginary symmetry plane is a equidistance from i) the second unit for the right-hand-drive vehicle is oriented in the position at which the second unit for the right-hand-drive vehicle is to be mounted on the right-hand-drive vehicle and ii) the second unit for the left-hand-drive vehicle is oriented in the position at which the second unit for the left-hand-drive vehicle is to be mounted on the left-hand-drive vehicle.

* * * * *